(12) United States Patent
Tang et al.

(10) Patent No.: US 12,014,477 B2
(45) Date of Patent: Jun. 18, 2024

(54) IMAGE PROCESSING METHOD AND DEVICE, IMAGE DETECTING METHOD AND SYSTEM, STORAGE MEDIUM

(71) Applicant: BOE Technology Group Co., Ltd., Beijing (CN)

(72) Inventors: Dawei Tang, Beijing (CN); Jijing Huang, Beijing (CN); Qiong Wu, Beijing (CN); Ge Ou, Beijing (CN); Chuqian Zhong, Beijing (CN); Zhiliang Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 321 days.

(21) Appl. No.: 17/501,874

(22) Filed: Oct. 14, 2021

(65) Prior Publication Data
US 2022/0156895 A1 May 19, 2022

(30) Foreign Application Priority Data
Nov. 19, 2020 (CN) .......................... 202011307773.6

(51) Int. Cl.
*G06T 5/77* (2024.01)

(52) U.S. Cl.
CPC ...... *G06T 5/77* (2024.01); *G06T 2207/10004* (2013.01); *G06T 2207/20192* (2013.01)

(58) Field of Classification Search
CPC ...................... G06T 5/00; G06T 5/005; G06T 2207/10004; G06T 2207/20192; G06T 2207/10116; G06T 2207/20084; G06T 7/00; G06T 7/0012; G06T 7/13
See application file for complete search history.

(56) References Cited

U.S. PATENT DOCUMENTS

| | | | | |
|---|---|---|---|---|
| 7,136,527 B2 * | 11/2006 | Ikeda | .......................... | G06T 7/12 382/199 |
| 7,705,884 B2 * | 4/2010 | Pinto | ................... | H04N 23/6842 348/208.99 |
| 10,542,193 B1 * | 1/2020 | Marteney | ................. | G06T 7/215 |
| 11,049,432 B2 * | 6/2021 | Kim | ...................... | G09G 3/2007 |

* cited by examiner

*Primary Examiner* — Edward F Urban
*Assistant Examiner* — Benedict E Lee
(74) *Attorney, Agent, or Firm* — IPro, PLLC

(57) ABSTRACT

An image processing method and device, an image detecting method and system, and a storage medium are provided. The image processing method comprises: acquiring a target image; counting pixels of the target image to obtain a count value; adding compensation data at a peripheral position of an edge pixel of the target image according to the count value, to obtain pixel data of the compensated target image.

13 Claims, 8 Drawing Sheets

| 0033 | 0022 | 0011 |
| --- | --- | --- |
| 0066 | 0055 | 0044 |
| 0099 | 0088 | 0077 |

Fig. 5

| 0 | 0 | 0 |
|---|---|---|
| 0 | 0033 | 0022 |
| 0 | 0066 | 0055 |

Fig. 7

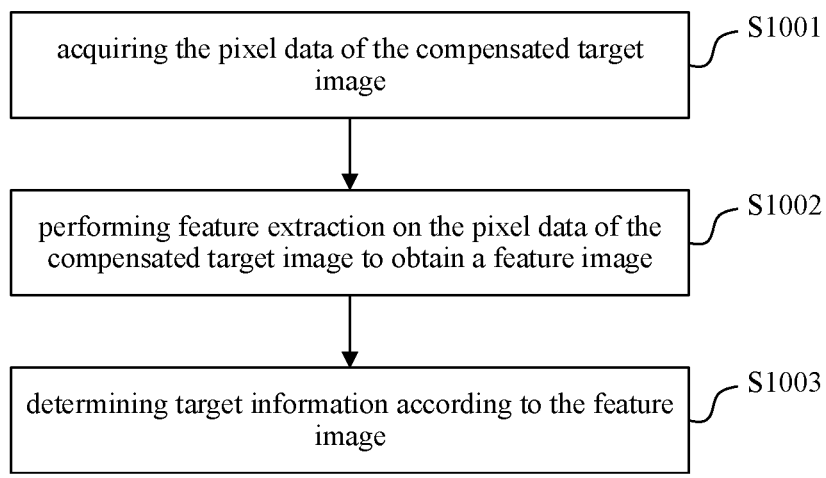
Fig. 9
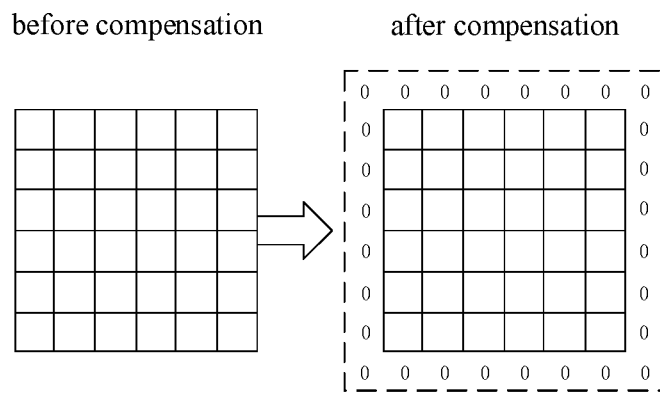
Fig. 10
Fig. 11

IMAGE PROCESSING METHOD AND DEVICE, IMAGE DETECTING METHOD AND SYSTEM, STORAGE MEDIUM

CROSS-REFERENCE TO RELATED APPLICATIONS

The present disclosure claims priority to Chinese Patent Application No. 202011307773.6 filed in China on Nov. 19, 2020, which is incorporated herein by reference in its entirety.

TECHNICAL FIELD

The present disclosure relates to the field of image processing technology, and in particularly to an image processing method and device, an image detecting method and system, and a storage medium.

BACKGROUND

When using a convolution neural network to perform information detection on an image, such as performing nidus detection on an x-ray image, since pixels on an edge of the image will not be located in a center of a convolution kernel and the convolution kernel will not extend beyond the edge region, typically the edge features of the input image cannot be extracted, which may lead to loss of some important information during information detection.

SUMMARY

The present disclosure proposes an image processing method and device, an image detecting method and system, and a storage medium, in view of the problem of the prior art.

In a first aspect, some embodiments of the present disclosure provide the image processing method which includes:
acquiring a target image;
counting pixels of the target image to obtain a count value;
adding compensation data at a peripheral position of an edge pixel of the target image according to the count value, to obtain pixel data of the compensated target image.

Optionally, the image processing method further includes: before adding the compensation data at the peripheral position of the edge pixel of the target image according to the count value,
receiving a Compensation Signal (CS);
determining the compensation data according to the compensation signal.

Optionally, the counting the pixels of the target image to obtain the count value includes:
counting pixel columns of the target image to obtain a column count value;
the adding the compensation data at the peripheral position of the edge pixel of the target image according to the count value includes:
adding the compensation data at the peripheral position of the first row of pixels in the target image according to the column count value, and outputting the pixel data of the first row of pixels and the compensation data;
adding the compensation data at the peripheral position of an $N^{th}$ row of pixels in the target image according to the column count value, and outputting the pixel data of the $N^{th}$ row of pixels and the compensation data;
adding the compensation data at the peripheral position of a first column of pixels and an $M^{th}$ column of pixels of the target image according to the column count value, and outputting the pixel data of the second row of pixels to an $(N-1)^{th}$ column of pixels,
wherein N and M are both integers greater than 1.

Optionally, the counting the pixels of the target image to obtain the count value further includes:
counting pixel rows of the target image to obtain a row count value;
wherein the image processing method further includes:
outputting pixel data of the compensated target image according to the row count value.

In a second aspect, some embodiments of the present disclosure provide the image information detecting method which includes:
acquiring pixel data of the compensated target image outputted after being processed by the image processing method provided in the first aspect of the embodiments of the present disclosure;
performing feature extraction on the pixel data of the compensated target image to obtain a feature image;
determining target information according to the feature image.

In a third aspect, some embodiments of the present disclosure provide an image processing device, including a counter and a data compensation circuit, wherein
the counter is in communication connection with the data compensation circuit;
the counter is configured for counting pixels of a target image to obtain a count value;
the data compensation circuit is configured for adding compensation data at a peripheral position of an edge pixel of the target image according to the count value, to obtain pixel data of the compensated target image.

Optionally, the image processing device further includes a compensation signal end which is in communication connection with the data compensation circuit, wherein
the data compensation circuit is further configured for determining the compensation data according to a compensation signal from the compensation signal end.

Optionally, the image processing device further includes: a data storage circuit which is in communication connection with the data compensation circuit, wherein the data storage circuit is configured for storing the target image.

Optionally, the counter includes: a column counter, wherein
the column counter is configured for counting pixel columns of the target image to obtain a column count value;
the data storage circuit includes: a first memory, a second memory, and a third memory;
each of the first memory, the second memory, and the third memory is electrically connected with the column counter;
the first memory is configured for storing the pixel data of a first row of pixels of the target image according to the column count value;
the second memory is configured for storing the pixel data of an $N^{th}$ row of pixels of the target image according to the column count value;
the third memory is configured for storing the pixel data of the second to $(N-1)^{th}$ rows of pixels of the target image according to the column count value;
N is an integer greater than 1.

Optionally, the data compensation circuit includes:

a first data gating circuit, wherein an enabling end, a first input end, and a second input end of the first data gating circuit are electrically connected with the column counter, the first memory, and the compensation signal end respectively, and the first data gating circuit is configured for adding the compensation data at the peripheral position of the first row of pixels stored in the first memory according to the column count value, and outputting the pixel data of the first row of pixels and the compensation data;

a second data gating circuit, wherein an enabling end, a first input end, and a second input end of the second data gating circuit are electrically connected with the column counter, the second memory, and the compensation signal end respectively, and the second data gating circuit is configured for adding the compensation data at the peripheral position of the $N^{th}$ row of pixels stored in the second memory according to the column count value, and outputting the pixel data of an $N^{th}$ row of pixels and the compensation data;

a third data gating circuit, wherein an enabling end, a first input end, and a second input end of the third data gating circuit are electrically connected with the column counter, the third memory, and the compensation signal end respectively, and the third data gating circuit is configured for adding the compensation data at the peripheral position of the first column of pixels and an $M^{th}$ column of pixels stored in the third memory according to the column count value, and outputting pixel data of the second row of pixels to an $(N-1)^{th}$ column of pixels, wherein M is an integer greater than 1.

Optionally, the counter further includes a row counter;

the row counter is configured for counting pixel rows of the target image, to obtain a row count value;

the image processing device further includes a data output circuit;

each of the row counter, the first data gating circuit, the second data gating circuit, and the third data gating circuit is electrically connected with the data output circuit;

the data output circuit is configured for outputting, according to the row count value, the pixel data of the target image compensated by the first data gating circuit, the second data gating circuit, and the third data gating circuit.

Optionally, the data output circuit includes a fourth data gating circuit and a fifth data gating circuit, wherein an enabling end, a first input end, and a second input end of the fourth data gating circuit are electrically connected with the row counter, an output end of the second data gating circuit, and an output end of the third data gating circuit respectively, and the fourth data gating circuit is configured for outputting, according to the row count value, the pixel data outputted by the second data gating circuit or the third data gating circuit;

an enabling end, a first input end, and a second input end of the fifth data gating circuit are electrically connected with the row counter, an output end of the first data gating circuit, and an output end of the fourth data gating circuit respectively, and the fifth data gating circuit is configured for outputting, according to the row count value, the pixel data outputted by the first data gating circuit or the fourth data gating circuit.

Optionally, the image processing device further includes a register circuit, wherein an input end of the register circuit is electrically connected with an output end of the fifth data gating circuit;

the register circuit is configured for buffering the pixel data outputted by the fifth data gating circuit.

In a fourth aspect, embodiments of the present disclosure provide an information detecting circuit and the image processing device provided in the third aspect of the embodiments of the present disclosure, wherein the information detecting circuit is in communication connection with the image processing device;

the information detecting circuit is configured for implementing the image information detecting method provided in the second aspect of the embodiment of the present disclosure.

In a fifth aspect, the embodiments of the present disclosure provide a computer-readable storage medium which stores a computer program, when the computer program is executed by a processor, the image processing method provided in the first aspect of the embodiments of the present disclosure, or the image information detecting method provided in the second aspect of the embodiments of the present disclosure.

Additional aspects and advantages of the disclosure will be partially presented in the following descriptions and partially become apparent from the following descriptions or get understood by implementing the present disclosure.

BRIEF DESCRIPTION OF THE DRAWINGS

The foregoing and/or additional aspects and advantages of the present disclosure will become apparent and readily appreciated from the following description of embodiments in conjunction with the accompanying drawings, in which:

FIG. 5 is a schematic diagram of pixel data to be convolved within a 3*3 convolution kernel area in an embodiment of the present disclosure;

FIG. 7 is a schematic diagram of pixel data to be convolved in a 3*3 convolution kernel area obtained by performing a compensation on the pixel data of FIG. 5 in an embodiment of the present disclosure;

FIG. 9 is a schematic diagram of pixel data to be convolved in a 3*3 convolution kernel area obtained by performing another compensation on the pixel data of FIG. 5 in an embodiment of the present disclosure;

FIG. 10 is a flowchart diagram of an image information detecting method provided by an embodiment of the present disclosure; and FIG. 11 is a schematic diagram of a comparison of a pre-compensation target image and a post-compensation target image in an embodiment of the present disclosure.

DETAILED DESCRIPTION

Figure 1:
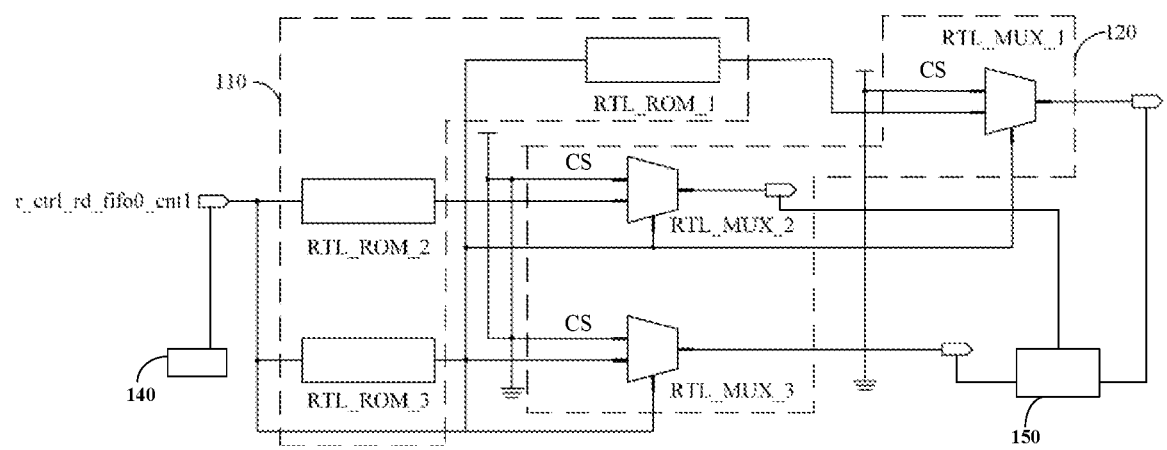
FIG. 1 is a structural diagram illustrating an image processing device provided by an embodiment of the present disclosure.

Description will now be made in detail to the present disclosure, examples of the embodiments of the present disclosure are illustrated in the accompanying drawings, wherein the same or similar reference numerals refer to the same or similar parts or parts having the same or similar functions throughout. Furthermore, if a detailed description of known technology is not necessary for illustrating the features of the present disclosure, it is omitted. The embodiments described below with reference to the drawings are exemplary and intended to explain the disclosure and should not be explained as limits to the disclosure.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the related art and will not be interpreted in an idealized or overly formal sense unless expressly so defined herein.

As used herein, the singular forms "a", "an", "the" and "this" may include the plural forms as well, unless expressly stated otherwise. It should be further understood that the terms "includes" and/or "including" when used in this specification, specify the presence of the features, integers, steps, operations, elements, and/or components, but do not preclude the presence or addition of one or more other features, integers, steps, operations, elements, components, and/or groups thereof. It should be understood that when an element is referred to as being "connected" or "coupled" to another element, it can be directly connected or coupled to the other element, or intervening elements may also be present. Furthermore, "connected" or "coupled" as used herein can include wirelessly connected or wirelessly coupled. As used herein, the term "and/or" includes all or any one of one or more associated listed items and all combinations thereof.

Hereinafter, the technical solutions of the present disclosure and how the technical solutions of the present disclosure solve the above technical problems will be described in detail with specific embodiments.

An embodiment of the present disclosure provides an image processing device, as shown in FIG. 1, which includes: a compensation signal end, a counter, a data storage circuit 110, and a data compensation circuit 120. The compensation signal end, the counter, and the data storage circuit 110 are in communication connection with the data compensation circuit 120; the communication connection includes an electrical connection and an optical fiber-based optical communication connection, and the electrical connection includes a wired electrical connection and a radio connection. The counter is configured for counting the pixels of the target image to obtain a count value; the data storage circuit 110 is configured for storing a target image; the data compensation circuit 120 is configured for determining compensation data according to a compensation signal from the compensation signal end; and according to the count value, the compensation data is added at a peripheral position of the edge pixels of the target image to obtain the pixel data of the compensated target image.

The compensation data in the embodiments of the present disclosure may be set according to actual demand, for example, may be set as 0.

Optionally, the counter includes a column counter 150; the column counter 150 counts the pixel columns of the target image to obtain a column count value (e.g. r_ctrl_rd_fifo0_cntl in FIG. 1).

Optionally, as shown in FIG. 1, the data storage circuit 110 includes a first memory RTL_ROM_1, a second memory RTL_ROM_2, and a third memory RTL_ROM_3, wherein the first memory RTL_ROM_1, the second memory RTL_ROM_2, and the third memory RTL_ROM_3 are all electrically connected with the column counter 150.

The first memory RTL_ROM_1 is configured for storing pixel data of a first row of pixels of a target image according to a column count value; the second memory RTL_ROM_2 is configured for storing pixel data of an $N^{th}$ row of pixels of the target image according to the column count value; the third memory RTL_ROM_3 is configured for storing pixel data of pixels of the rows from the second row to the $(N-1)^{th}$ row of the target image according to the column count value; and N is an integer greater than 1.

Each of the first memory, the second memory, and the third memory in the embodiments of the present disclosure may be a ROM (Read-Only Memory) or another type of static storage device that may store static information and instructions, e.g., a RAM (Random Access Memory), or another type of dynamic storage device that may store information and instructions, or may also be EEPROM (Electrically Erasable Programmable Read Only Memory), CD-ROM (Compact Disc Read Only Memory), or an optical disk storage (including a compact disc, a laser disc, an optical disc, a digital versatile disc, a blue-ray disc and the like), a disk storage medium or other magnetic storage equipment, or any other medium configurable to contain or store an expected program code in an instruction or data structure form and accessible for a computer.

Optionally, as shown in FIG. 1, the data compensation circuit 120 includes: a first data gating circuit RTL_MUX_1, a second data gating circuit RTL_MUX_2, and a third data gating circuit RTL_MUX_3. The first data gating circuit RTL_MUX_1 includes an enabling end, a first input end, and a second input end electrically connected with the column counter 150, the first memory RTL_ROM_1, and the compensation signal end respectively, and is configured for adding compensation data at a peripheral position of the first row of pixels stored in the first memory RTL_ROM_1 according to the column count value and outputting the pixel data and the compensation data of the first row of pixels. The second data gating circuit RTL_MUX_2 includes an enabling end, a first input end, and a second input end electrically connected with the column counter 150, the second memory RTL_ROM_2, and a compensation signal end respectively, and is configured for adding compensation data at the peripheral position of the $N^{th}$ row of pixels stored in the second memory RTL_ROM_2 according to the column count value and outputting pixel data and compensation data of the $N^{th}$ row of pixels. The third data gating circuit RTL_MUX_3 includes an enabling end, a first input end and, a second input end electrically connected with the column counter 150, the third memory RTL_ROM_3, and a compensation signal end respectively, and is configured for adding the compensation data at the peripheral position of the first column of pixels and the $M^{th}$ column of pixels stored in the third memory RTL_ROM_3 according to the column count value and outputting pixel data from the second row to the $(N-1)^{th}$ column of pixels; and M is an integer greater than 1.

Optionally, the counter further includes a row counter 140; the row counter 140 is configured for counting pixel rows of the target image to obtain a row count value (e.g. r_rd_fm_row_cntl in FIG. 1).

Figure 2:
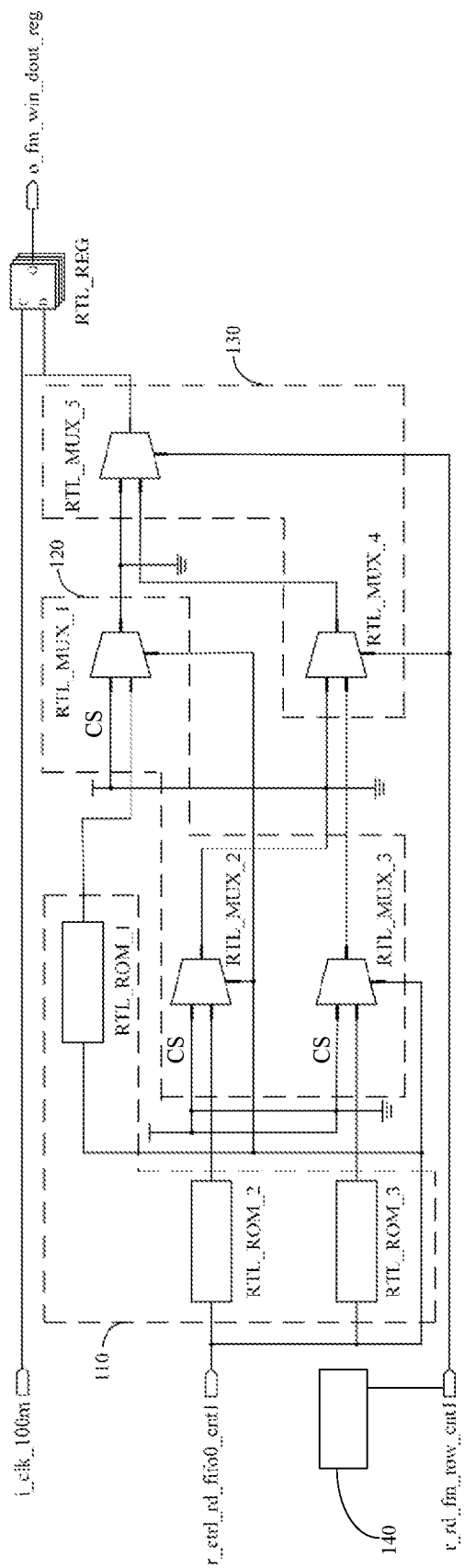
FIG. 2 is a structural diagram illustrating another image processing device provided by an embodiment of the present disclosure.

Optionally, as shown in FIG. 2, an image processing device provided by the embodiment of the present disclosure further includes: a data output circuit 130. The row counter 140, the first data gating circuit RTL_MUX_1, the second data gating circuit RTL_MUX_2, and the third data gating circuit RTL_MUX_3 are all electrically connected with the data output circuit 130; the data output circuit 130 is configured for outputting the pixel data of the target image compensated by the first data gating circuit RTL_MUX_1, the second data gating circuit RTL_MUX_2, and the third data gating circuit RTL_MUX_3 according to the row count value.

Optionally, as shown in FIG. 2, the data output circuit 130 includes: a fourth data gating circuit RTL_MUX_4 and a fifth data gating circuit RTL_MUX_5. The fourth data gating circuit RTL_MUX_4 includes an enabling end, a first input end, and a second input end electrically connected with the row counter 140, the output end of the second data gating circuit RTL_MUX_2, and the output end of the third data gating circuit RTL_MUX_3 respectively, and is configured for outputting pixel data outputted by the second data gating circuit RTL_MUX_2 or the third data gating circuit RTL_MUX_3 according to the row count value. The fifth data gating circuit RTL_MUX_5 includes an enabling end, a first input end, and a second input end electrically connected with the row counter 140, the output end of the first data gating circuit RTL_MUX_1, and the output end of the fourth data gating circuit RTL_MUX_4 respectively, and is configured for outputting pixel data outputted by the first data gating circuit RTL_MUX_1 or the fourth data gating circuit RTL_MUX_4 according to the row count value.

Optionally, in the embodiments of the present disclosure, the image processing device further includes a register circuit RTL_REG. The input end D of the register circuit RTL_REG is electrically connected with the output end of the fifth data gating circuit RTL_MUX_5. The register circuit RTL_REG is configured for buffering the pixel data outputted by the fifth data gating circuit RTL_MUX_5.

Optionally, the register circuit RTL_REG includes a plurality of flip-flop circuits (e.g. D flip-flop circuit) connected in sequence; the register circuit RTL_REG may output buffered pixel data and compensation data via the output end Q according to the needs of subsequent circuits or modules.

Referring to FIG. 2, a clock end C of the register circuit RTL_REG is electrically connected with a system clock i_clk_100 m, which may have a frequency of 100 MHz (megahertz).

N and M in the embodiments of the present disclosure may be determined based on a particular target image. For example, for a 416*416 target image, both N and M are 416.

For example, for the 416*416 target image, each pixel value is 16-bit (bit) data, the bit width of each of the row counter 140 and the column counter 150 can be 9 bits, and the counting range can be 0 to 415; the input and output of each of the first data gating circuit RTL_MUX_1 and the second data gating circuit RTL_MUX_2 are both 96 bits, the output compensation is 144 bits, and is a high bit compensation; and the input and output of each of the third data gating circuit RTL_MUX_3, the fourth data gating circuit RTL_MUX_4, and the fifth data gating circuit RTL_MUX_5 are all 144 bits.

Figure 3:
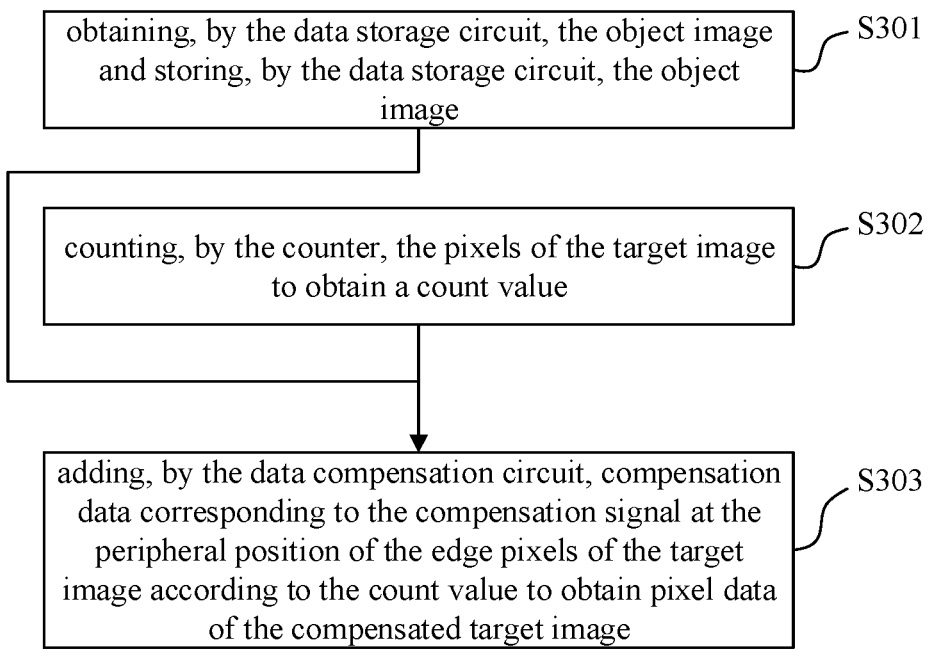
FIG. 3 is a flowchart diagram of an image processing method provided by an embodiment of the present disclosure.

Based on the same inventive concept, the embodiment of the present disclosure provides an image processing method, which can be applied to an image processing device, as shown in FIG. 3, the method includes steps S301-S301. The step S301 includes: obtaining, by the data storage circuit 110, an object image and storing, by the data storage circuit 110, the object image.

The disclosed embodiments may be applied to a convolutional neural network, and the target image may be an original image to be input into the convolutional neural network, or a feature image subjected to a preliminary convolution.

Optionally, when the target image is being stored, the pixel data of different rows are stored respectively, the pixel data of the first row of pixels is stored in the first memory RTL_ROM_1, and the pixel data of the $N^{th}$ row of pixels is stored in the second memory RTL_ROM_2, and the pixel data of the second to the $(N-1)^{th}$ rows of pixels is stored in the third memory RTL_ROM_3.

The step S302 includes: counting, by the counter, the pixels of the target image to obtain a count value.

Optionally, the counting, by the counter, the pixels of the target image to obtain the count value includes: the column counter 150 counts the pixel columns of the target image to obtain a column count value.

Optionally, the counting, by the counter, the pixels of the target image to obtain the count value further includes: the row counter 140 counts the pixel rows of the target image to obtain a row count value.

The step S303 includes: adding, by the data compensation circuit 120, compensation data corresponding to the compensation signal at the peripheral position of the edge pixels of the target image according to the count value to obtain pixel data of the compensated target image, wherein before the step S303, the compensation signal can be received from the compensation signal end, and the compensation data can be determined according to the compensation signal.

Optionally, the first data gating circuit RTL_MUX_1 adds the compensation data at the peripheral position of the first row of pixels in the target image according to the column count value, and outputs the pixel data and the compensation data of the first row of pixels, and data pre-compensation for the first column of pixel data can be realized in the process (namely, adding compensation data at the peripheral position of the first row of pixels in the first column); a second data gating circuit RTL_MUX_2 adds the compensation data at the peripheral position of an $N^{th}$ row of pixels of the target image according to the column count value, and outputs pixel data and the compensation data of the $N^{th}$ row of pixels, and data pre-compensation for the first column of data can be realized in the process (namely, adding the compensation data at the peripheral position of the pixel in the $N^{th}$ row and the first column); and a third data gating circuit RTL_MUX_3 adds the compensation data at the peripheral position of the first column of pixels and the $M^{th}$ column of pixels of the target image according to the column count value, and outputs the pixel data of pixels from the second row to the $(N-1)^{th}$ column, wherein N and M are both integers greater than 1.

Figure 4:
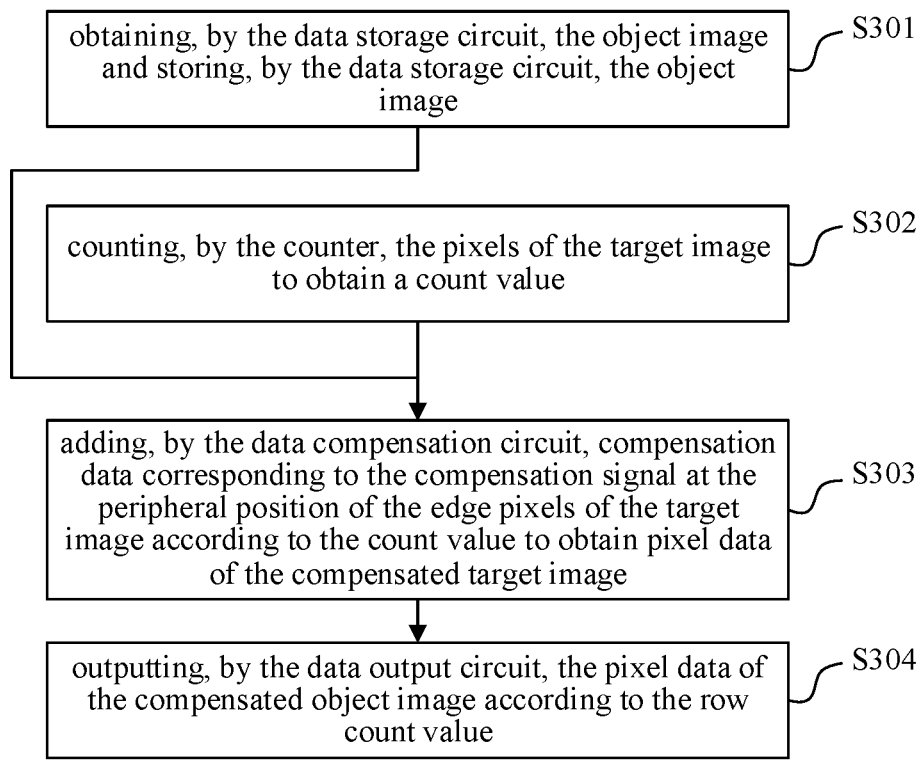
FIG. 4 is a flowchart diagram of another image processing method provided by an embodiment of the present disclosure.

Optionally, as shown in FIG. 4, the image processing method provided by the embodiment of the present disclosure, on the basis of the above-mentioned steps of S301 to S303, further includes a following step S304. The step S304 includes: outputting, by the data output circuit 130, the pixel data of the compensated object image according to the row count value.

Optionally, the fourth data gating circuit RTL_MUX_4 outputs an output value of the second data gating circuit RTL_MUX_2 or the third data gating circuit RTL_MUX_3 according to the row count value.

Optionally, when the row count value is the row number of the $N^{th}$ row of pixels, the fourth data gating circuit RTL_MUX_4 outputs the pixel data outputted by the second data gating circuit RTL_MUX_2, namely, compensation data and pixel data of the $N^{th}$ row of pixels; when the row count value is the row number other than the $N^{th}$ row of pixels, the pixel data outputted by the third data gating circuit RTL_MUX_3, i.e., the pixel data of the second row of pixels to the N−$1^{th}$ column of pixels and the compensation data of the first column of pixels and the $M^{th}$ column of pixels therein, are output.

Optionally, the fifth data gating circuit RTL_MUX_5 outputs the output value of the first data gating circuit RTL_MUX_1 or the fourth data gating circuit RTL_MUX_4 according to the row count value.

Optionally, when the row count value is the number of rows of the first row of pixels, the fifth data gating circuit RTL_MUX_5 outputs the pixel data outputted by the first data gating circuit RTL_MUX_1, namely, the pixel data and the compensation data of the first row of pixels; when the row count value is the row number other than the first row of pixels, the fifth data gating circuit RTL_MUX_5 outputs the pixel data outputted by the fourth data gating circuit RTL_MUX_4, i.e., the pixel data of the second row to the $(N-1)^{th}$ row of pixels and the compensation data of the first column of pixels and the $M^{th}$ column of pixels therein.

For example, taking a target image of 416*416 pixels as an example, when the row count value is 0, the fourth data gating circuit RTL_MUX_4 outputs the pixel data of the second row to the $415^{th}$ row of pixels, the compensation data of the first column of pixel and the $416^{th}$ column of pixels therein, and the fifth data gating circuit RTL_MUX_5 outputs the pixel data and the compensation data of the first row of pixels; when the row count value is 415, the fourth data gating circuit RTL_MUX_4 outputs the pixel data and the compensation data of the $416^{th}$ row of pixels, and the fifth data gating circuit RTL_MUX_5 also outputs the pixel data and the compensation data of the $416^{th}$ row of pixels; and when the row count value is in a range from 1 to 144, the fourth data gating circuit RTL_MUX_4 outputs the pixel data of the second row to the $415^{th}$ row of pixels and the compensation data of the first column of pixels and the $416^{th}$ column of pixels therein, and the fifth data gating circuit RTL_MUX_5 also outputs the pixel data of the second row to the $415^{th}$ row of pixels and the compensation data of the first column of pixels and the $416^{th}$ column of pixels therein.

The compensation effect of the image processing device and the image processing method provided by the embodiments of the present disclosure is described below as an example.

Assuming that the pixel data to be convolved within a 3*3 convolution kernel area is as shown in FIG. 5, a simulation experiment is performed on the pixel data shown in FIG. 5 using the image processing device and the image processing method provided by the embodiments of the present disclosure.

Figure 6:
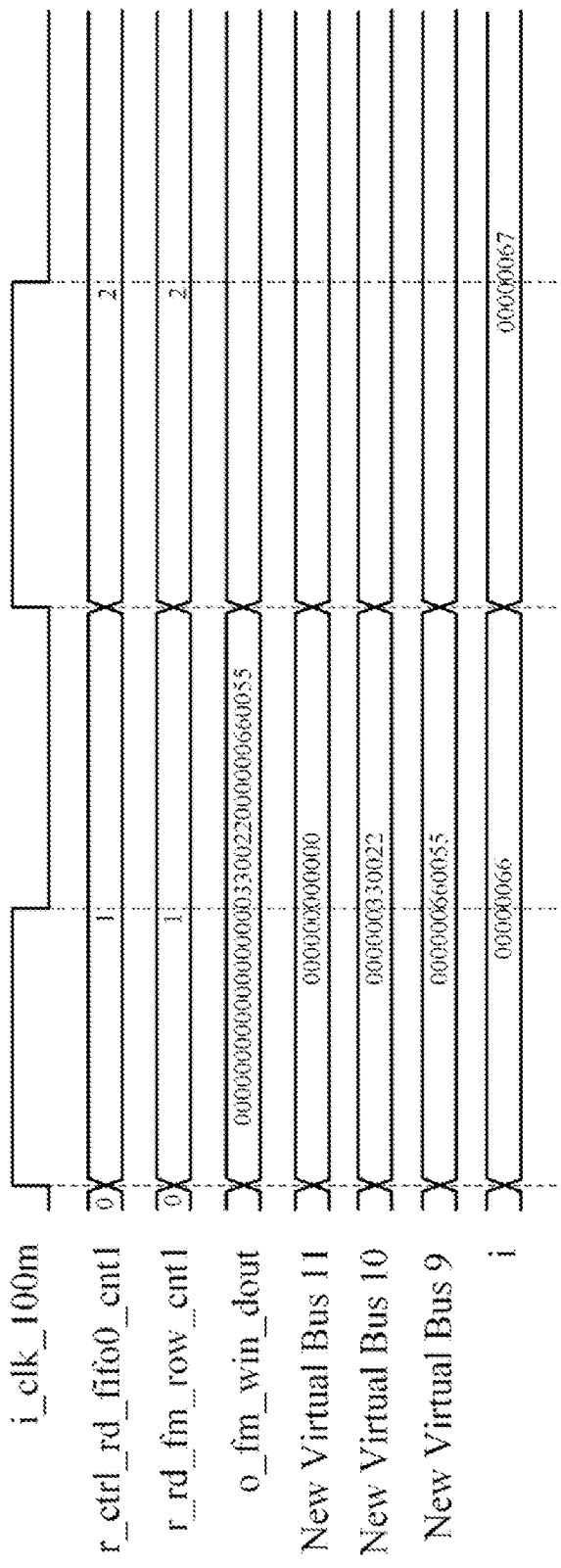
FIG. 6 is a schematic diagram of a compensated output waveform for compensating the pixel data of FIG. 5 in an embodiment of the present disclosure.
Figure 7:
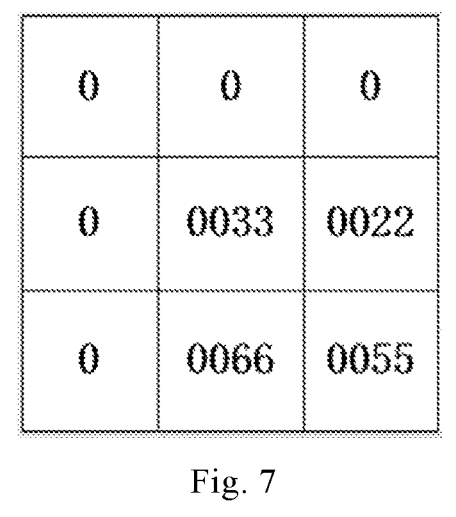

When the row count value and the column count value are both 0, a compensation operation is performed on the upper edge pixels and the left edge pixels in FIG. 5; the compensation output waveform is shown in FIG. 6, wherein i represents a simulation moment, and when i=66, the pixel data after compensation is shown in FIG. 7. When the row count value and the column count value are both 415, the compensation operation is performed on the lower edge pixels and the right edge pixels in FIG. 5; the compensation output waveform is shown in FIG. 8, wherein i represents the simulation moment, and when i=205, the pixel data after compensation is shown in FIG. 9.

In FIG. 6, the o_fm_win_dout represents the output of all the pixel data to be convolved corresponding to the 3*3 convolution kernel in FIG. 7 (corresponding to the output of the register circuit as shown in FIG. 2), the New Virtual Bus 11 represents the output corresponding to the first row in FIG. 7, the New Virtual Bus 10 represents the output corresponding to the second row in FIG. 7, and the New Virtual Bus 9 represents the output corresponding to the third row in FIG. 7.

Figure 8:
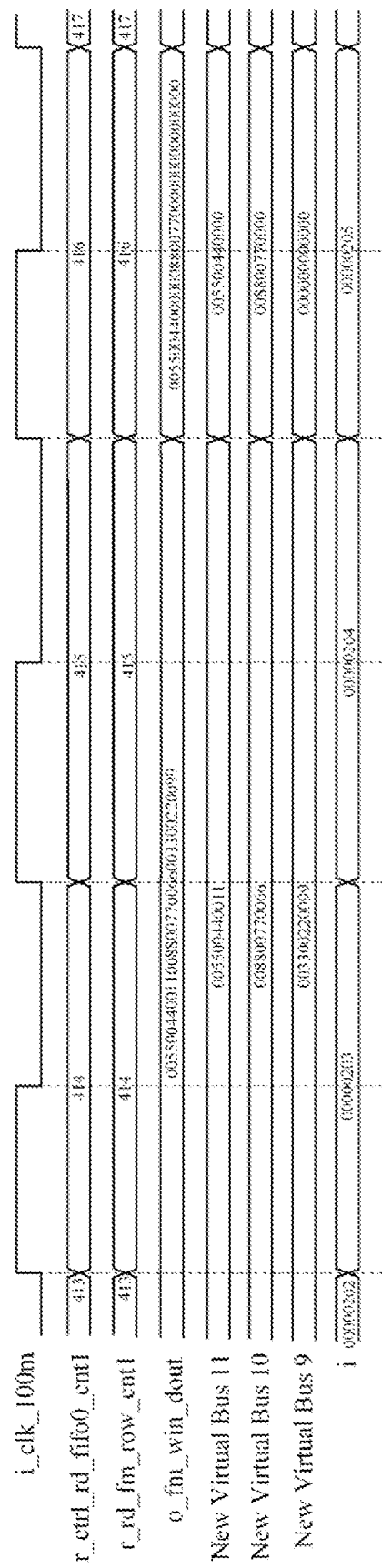
FIG. 8 is a schematic diagram of another compensated output waveform for compensating the pixel data of FIG. 5 in an embodiment of the present disclosure.

In FIG. 8, the o_fm_win_dout represents the output of all the pixel data to be convolved corresponding to the 3*3 convolution kernel in FIG. 9 (corresponding to the output of the register circuit as shown in FIG. 2), the New Virtual Bus 11 represents the output corresponding to the first row in FIG. 9, the New Virtual Bus 10 represents the output corresponding to the second row in FIG. 9, and the New Virtual Bus 9 represents the output corresponding to the third row in FIG. 9.

For the 3*3 convolution kernel, the image processing device provided by an embodiment of the present disclosure may output corresponding buffered data according to a convolution position of the convolution kernel in a subsequent convolution process. If the convolution position of the convolution kernel in the subsequent convolution process is in a non-edge pixel region of the original target image, 9 groups of pixel data of the original target image are output; if the convolution position of the convolution kernel in the subsequent convolution process is in the edge pixel region of the original target image, 9 groups of pixel data of the compensated target image are output; and for convolution kernels of other sizes, the output of the image processing device is in a similar manner.

By using the image processing device and method provided by the embodiments of the present disclosure, at least the following advantageous effects can be achieved:

1) In the embodiments of the present disclosure, according to the counting of the counter, the traversal of each pixel of the target image can be achieved; the compensation of the traversed edge pixels can be achieved by adding the compensation data at the peripheral position of the edge pixels of the target image, so that the subsequent convolution operation can be extended to the edge pixels and the size of the input image and that of the output image can be consistent, so as to maintain the information integrity of the target image and avoid losing important information.

2) In the embodiments of the present disclosure, the pixel data of different pixel rows of the target image can be respectively stored, and separate processing based on the respectively stored pixel data can be realized, namely, the pixel data of an edge pixel row and the pixel data of an edge pixel column can be separately compensated, and original pixel data for a non-edge area can be retained, so that the calculation can be simplified to realize targeted and fast edge compensation.

Based on the same inventive concept, the embodiment of the present disclosure provides the image information detecting system, which includes an information detecting circuit and any of the image processing devices provided by the embodiments of the present disclosure, wherein the information detecting circuit and the image processing device are in communication connection. The information detecting circuit is configured for implementing any of the image information detecting methods provided by the embodiments of the present disclosure.

Based on the same inventive concept, an embodiment of the present disclosure provides the image information detecting method, as shown in FIG. 10, which includes steps S1001-S1003.

The step S1001 includes: acquiring the pixel data of the compensated target image.

The pixel data of the compensated target image is the data obtained after being processed by the image processing method provided by the embodiments of the present disclosure, namely, the original pixel data and the compensation data of the target image.

For example, the compensated target image is shown in the right sub-figure in FIG. 11, and the original target image before compensation is shown in the left sub-figure in FIG. 11.

The step S1002 includes: performing feature extraction on the pixel data of the compensated target image to obtain a feature image.

The step S1003 includes: determining target information according to the feature image.

The image information detecting system and method provided by the embodiments of the present disclosure can be applied to the field of nidus detection based on an x-ray image, for example, the nidus detection based on a target detection network yolov2-tiny. For the x-ray image, after the x-ray image is subjected to the image processing method provided by the embodiments of the present disclosure, feature extraction can be performed thereon to obtain the feature image; then nidus information is detected according to the feature image; and since compensation for edge pixels has been performed in advance, the features of the edge pixels can be extracted in this feature extraction process, so as to avoid the omission of information.

Based on the same inventive concept, the embodiments of the present disclosure provide the computer-readable storage medium which stores a computer program, when the computer program is executed by a processor, any of the image processing methods or any of the image information detecting methods is implemented.

The computer readable medium includes, but is not limited to, any type of disk (including floppy disks, hard disks, optical disks, CD-ROMs, and magneto-optical disks), ROMs, RAMs, EPROMs (Erasable Programmable Read-Only Memories), EEPROMs, flash memories, magnetic or optical cards. That is, the readable medium includes any medium that stores or transmits information that can be read by equipment (e.g. a computer).

Embodiments of the present disclosure provide the computer-readable storage medium suitable for any of the image processing methods or any of the image information detecting methods described above and will not be described in further detail herein.

Those skilled in the art should understand that the various operations, methods, steps, acts, schemes, etc. discussed in the present disclosure may be alternated, altered, combined, or deleted. Further, operations, methods, other steps, acts, schemes, etc. in the various operations, methods, schemes, etc. discussed in the present disclosure may be alternated, altered, rearranged, decomposed, combined, or deleted.

In the description of the present disclosure, it should be understood that the terms "first" and "second" are used for descriptive purposes only and are not to be construed as indicating or implying relative importance or implicitly indicating the number of technical features indicated. Therefore, a feature defined by "first" and "second" may explicitly or implicitly indicate inclusion of one or more such features. In the description of the present disclosure, the meaning of "a plurality of" is two or more unless otherwise specified.

It should be understood that, although the various steps in the flowcharts of the drawings are shown in order as indicated by the arrows, the steps are not necessarily performed in the order indicated by the arrows. The steps are performed in no strict order unless explicitly stated herein, and may be performed in other orders. Furthermore, at least some of the steps in the flowcharts of the drawings may include a plurality of sub-steps or a plurality of stages, which are not necessarily performed at the same time, but may be performed at different times, in a different order, and may be performed in turn or in alternation with at least some of the other steps or sub-steps or stages of other steps.

While the foregoing is only part of embodiments of the present disclosure, it should be understood by those skilled in the art that various improvements and modifications may be made without departing from the principle of the present disclosure, and theses improvement and modifications shall fall within the scope of protection of the present disclosure.

What is claimed is:

1. An image processing method, comprising:
    acquiring a target image;
    counting pixels of the target image to obtain a count value;
    adding compensation data at a peripheral position of an edge pixel of the target image according to the count value, to obtain pixel data of the compensated target image;
    wherein the counting the pixels of the target image to obtain the count value comprises:
    counting pixel columns of the target image to obtain a column count value;
    the adding the compensation data at the peripheral position of the edge pixel of the target image according to the count value comprises:
    adding the compensation data at the peripheral position of the first row of pixels in the target image according to the column count value, and outputting the pixel data of the first row of pixels and the compensation data;
    adding the compensation data at the peripheral position of an Nth row of pixels in the target image according to the column count value, and outputting the pixel data of the Nth row of pixels and the compensation data;
    adding the compensation data at the peripheral position of a first column of pixels and an Mth column of pixels of the target image according to the column count value, and outputting the pixel data of the second row of pixels to an (N−1)th column of pixels;
    wherein N and M are both integers greater than 1.

2. The image processing method according to claim 1, further comprising: before adding the compensation data at the peripheral position of the edge pixel of the target image according to the count value,
    receiving a compensation signal;
    determining the compensation data according to the compensation signal.

3. The image processing method according to claim 1, wherein the counting the pixels of the target image to obtain the count value further comprises:
    counting pixel rows of the target image to obtain a row count value;

wherein the image processing method further comprises:
outputting pixel data of the compensated target image according to the row count value.

4. An image information detecting method, comprising:
acquiring a target image;
counting pixels of the target image to obtain a count value;
adding compensation data to a peripheral position of an edge pixel of the target image according to the count value, to obtain pixel data of the compensated target image;
performing feature extraction on the pixel data of the compensated target image, to obtain a feature image;
determining target information according to the feature image;
wherein the counting the pixels of the target image to obtain the count value comprises:
counting pixel columns of the target image to obtain a column count value;
the adding the compensation data to the peripheral position of the edge pixel of the target image according to the count value comprising:
adding the compensation data at the peripheral position of the first row of pixels in the target image according to the column count value, and outputting the pixel data of the first row of pixels and the compensation data;
adding the compensation data at the peripheral position of an Nth row of pixels in the target image according to the column count value, and outputting the pixel data of the Nth row of pixels and the compensation data;
adding the compensation data at the peripheral position of a first column of pixels and an Mth column of pixels of the target image according to the column count value, and outputting the pixel data of the second row of pixels to the (N−1)th column of pixels,
wherein N and M are both integers greater than 1.

5. The image information detecting method according to claim 4, further comprising:
before adding compensation data at the peripheral position of the edge pixel of the target image according to the count value,
receiving a compensation signal;
determining the compensation data according to the compensation signal.

6. An image processing device, comprising a counter and a data compensation circuit, wherein
the counter is in communication connection with the data compensation circuit;
the counter is configured for counting pixels of a target image to obtain a count value;
the data compensation circuit is configured for adding compensation data at a peripheral position of an edge pixel of the target image according to the count value, to obtain pixel data of the compensated target image;
the image processing device further comprises: a compensation signal end which is in communication connection with the data compensation circuit, wherein
the data compensation circuit is further configured for determining the compensation data according to a compensation signal from the compensation signal end;
the image processing device further comprises: a data storage circuit which is in communication connection with the data compensation circuit, wherein the data storage circuit is configured for storing the target image;
wherein the counter comprises a column counter, wherein the column counter is configured for counting pixel columns of the target image to obtain a column count value;
the data storage circuit comprises: a first memory, a second memory, and a third memory;
each of the first memory, the second memory, and the third memory is electrically connected with the column counter;
the first memory is configured for storing the pixel data of a first row of pixels of the target image according to the column count value;
the second memory is configured for storing the pixel data of an Nth row of pixels of the target image according to the column count value;
the third memory is configured for storing the pixel data of the second to (N−1)th rows of pixels of the target image according to the column count value;
N is an integer greater than 1.

7. The image processing device according to claim 6, wherein the data compensation circuit comprises:
a first data gating circuit, wherein an enabling end, a first input end, and a second input end of the first data gating circuit are electrically connected with the column counter, the first memory, and the compensation signal end respectively, and the first data gating circuit is configured for adding the compensation data at the peripheral position of the first row of pixels stored in the first memory according to the column count value, and outputting the pixel data of the first row of pixels and the compensation data;
a second data gating circuit, wherein an enabling end, a first input end, and a second input end of the second data gating circuit are electrically connected with the column counter, the second memory, and the compensation signal end respectively, and the second data gating circuit is configured for adding the compensation data at the peripheral position of the Nth row of pixels stored in the second memory according to the column count value, and outputting the pixel data of an Nth row of pixels and the compensation data;
a third data gating circuit, wherein an enabling end, a first input end, and a second input end of the third data gating circuit are electrically connected with the column counter, the third memory, and the compensation signal end respectively, and the third data gating circuit is configured for adding the compensation data at the peripheral position of the first column of pixels and an Mth column of pixels stored in the third memory according to the column count value, and outputting pixel data of the second row of pixels to an (N−1)th column of pixels, wherein M is an integer greater than 1.

8. The image processing device according to claim 7, wherein the counter further comprises a row counter;
the row counter is configured for counting pixel rows of the target image, to obtain a row count value;
the image processing device further comprises a data output circuit;
each of the row counter, the first data gating circuit, the second data gating circuit, and the third data gating circuit is electrically connected with the data output circuit;
the data output circuit is configured for outputting, according to the row count value, the pixel data of the target image compensated by the first data gating circuit, the second data gating circuit, and the third data gating circuit.

9. The image processing device according to claim 8, wherein the data output circuit comprises a fourth data gating circuit and a fifth data gating circuit, wherein
- an enabling end, a first input end, and a second input end of the fourth data gating circuit are electrically connected with the row counter, an output end of the second data gating circuit, and an output end of the third data gating circuit respectively, and the fourth data gating circuit is configured for outputting, according to the row count value, the pixel data outputted by the second data gating circuit or the third data gating circuit;
- an enabling end, a first input end, and a second input end of the fifth data gating circuit are electrically connected with the row counter, an output end of the first data gating circuit, and
- an output end of the fourth data gating circuit respectively, and the fifth data gating circuit is configured for outputting, according to the row count value, the pixel data outputted by the first data gating circuit or the fourth data gating circuit.

10. The image processing device according to claim 9, further comprising a register circuit, wherein an input end of the register circuit is electrically connected with an output end of the fifth data gating circuit;
- the register circuit is configured for buffering the pixel data outputted by the fifth data gating circuit.

11. An image information detecting system, comprising an information detecting circuit and the image processing device according to claim 8, wherein the information detecting circuit is in communication connection with the image processing device;
- the information detection circuit is configured for performing feature extraction on the pixel data of the compensated target image to obtain a feature image, and determining target information according to the feature image.

12. A non-transitory computer-readable storage medium, on which a computer program is stored, when the computer program is executed by a processor, the image processing method according to claim 1 is implemented.

13. A non-transitory computer-readable storage medium, on which a computer program is stored, when the computer program is executed by a processor, the image processing method according to claim 4 is implemented.

* * * * *